Nov. 25, 1941.  C. W. STANCLIFFE  2,264,170
MIXING OF MATERIALS
Filed March 18, 1940    6 Sheets-Sheet 1

Fig. 1.

Inventor
Cecil Wheatley Stancliffe
by
Munn, Anderson & Liddy
Attorneys

Nov. 25, 1941.  C. W. STANCLIFFE  2,264,170
MIXING OF MATERIALS
Filed March 18, 1940  6 Sheets-Sheet 4

Inventor
Cecil Wheatley Stancliffe
by
Munn, Anderson & Liddy
Attorneys

Nov. 25, 1941.   C. W. STANCLIFFE   2,264,170
MIXING OF MATERIALS
Filed March 18, 1940   6 Sheets-Sheet 5

Inventor
Cecil Wheatley Stancliffe
by
Munn, Anderson & Liddy
Attorneys

Patented Nov. 25, 1941

2,264,170

UNITED STATES PATENT OFFICE 2,264,170

MIXING OF MATERIALS

Cecil Wheatley Stancliffe, Crowborough, England

Application March 18, 1940, Serial No. 324,473
In Great Britain March 28, 1939

10 Claims. (Cl. 259—154)

This invention relates to mixing machines and especially though not essentially to machines for mixing concrete.

In a mixing machine in accordance with the invention, the materials are mixed on a conveyor by agitating, stirring or other mixing devices (hereinafter referred to as agitators). The machine may deliver mixed material continuously or may be arranged to deal with batches of material.

One type of machine in accordance with the invention comprises a moving surface (such as, for example, the surface of an endless belt or equivalent conveyor) on which the material to be mixed is placed and moved past one or more devices by which the material is thoroughly mixed. If the machine is to deliver continuously, the mixed material may be discharged at the end of the conveyor. If batch mixing is desired, the mixing devices may be arranged to throw the material back on to the conveyor so that it is again brought to the mixing devices; or, in some cases, the conveyor may move intermittently and the material may be mixed during periods of rest.

The material on the moving surface is confined between side walls which, with the moving surface, form a trough. The side walls may be fixed or (especially if the mixed material is such as to tend to lag relatively to the mixing surface) may comprise endless belts which assist in moving the material.

Means are provided to supply the materials in correct proportions to the machine. In one form, such means comprises an endless conveyor or the equivalent (which may also provide the moving surface on which the materials are mixed) on which the different materials are deposited in layers, (which may be on top of one another or side by side) the thickness of each layer being determined by a stroke, screed or the like arranged at a predetermined distance above the conveyor and extending across it. Each stroke, screed or the like may be adjustable in height so that the quantity of each material may be adjusted as required.

The screeds (or some at least of them) are preferably interconnected with one another and with the liquid supply (when liquid is to be mixed with the other materials) so that they may be adjusted to set the mixer for any one of a number of different mixes and scales or the equivalent are preferably provided to avoid the necessity of calculation in regard to these mixes. By setting the screeds and liquid supply valves in accordance with the markings on these scales, the aggregate/sand/cement ratio of concrete to be mixed, for example, may be adjusted, the sand screed adjusted to compensate for the moisture in the sand, and the water supply reduced accordingly, the proportion of cement varied to vary the strength of the mixed concrete and the desired water/cement ratio varied.

When as in concrete mixing, a definite proportion of liquid is to be mixed with the other materials, means may be provided to control the supply of liquid in accordance with the speed of the belt (or the equivalent) on which the mixing is done so that variations in this speed do not affect the proportion of liquid in the mix. For example, the liquid may be delivered into compartments of a rotary member rotated in synchronism with the driving roller of the conveyor. The volume of these compartments may be adjustable in accordance with the required ratio of water to one of the ingredients (for example the water/cement ratio of concrete) and/or in accordance with the moisture content of one of the ingredients (for example, of the sand in a concrete mix).

In some cases, it may be desirable to proportion the materials by weight and in this case, an endless conveyor or the equivalent may be mounted on a weighing machine and the materials may be deposited on the conveyor successively, the weight of each material deposited being indicated on the weighing machine. The materials can be discharged into the mixing machine by moving the conveyor belt so that they are discharged therefrom at one end.

The improved means previously referred to for proportioning materials to be mixed may be used in conjunction with any suitable type of mixing machine and this part of the invention is not therefore restricted to its application to the improved mixing machine herein described. It will be seen that when such proportioning means are used, the material discharges in correct proportions into the mixer and tends to mix as it falls into the mixer or the hopper thereof thus giving a partial dry mix and lessening the time of mix necessary in the actual mixer.

Some specific embodiments of which the new or improved features, combinations and arrangements of parts form in themselves parts of the invention will now be described in some detail with reference to the accompanying drawings in which.

The machines shown are primarily intended for the continuous mixing of concrete and will be described in connection with this use.

The machine shown in Figs. 1 to 5 forms a self-contained unit which is transportable on road wheels either by trailing it behind a tractor or the like, or under its own power.

The machine comprises a chassis 1 on which is mounted an endless belt 2 passing around a driving pulley 3 and a return pulley 4 at opposite ends of the chassis.

Figures 5, 6, 7:
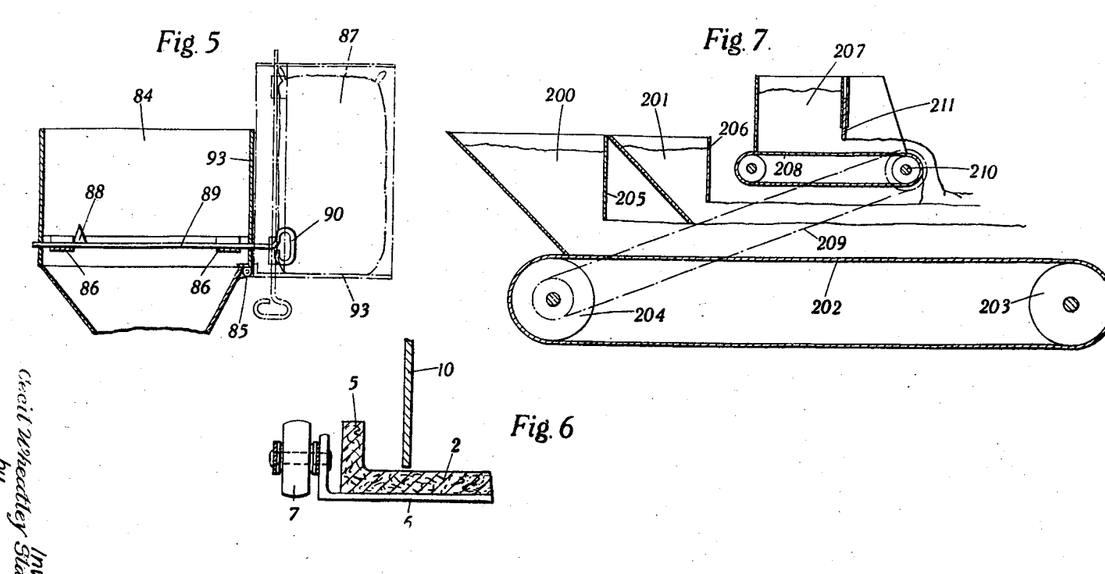
Fig. 5 is a section on the lines V—V of Fig. 4.
Fig. 6 is a view to an enlarged scale showing the connection of the belt to the conveyor chains.
Fig. 7 is a diagrammatic sketch of another arrangement.

The endless belt 2 is of flexible material, such for example as rubber and its cross-section is a shallow trough with flanges 5 at each edge. Along the side (or along both sides) of the belt is arranged a roller chain 7 driven from sprockets 8, 9 coaxial with the pulleys 3, 4. As shown in Fig. 6 this chain is attached at intervals to bars or rods 6 which are fixed to the bottom of the belt 2. This arrangement gives the belt a more positive drive than would the pulleys alone and prevents undue stretch and slip, whilst the belt is supported throughout at fairly close intervals by the bars 6.

At each side of the belt are arranged side walls 10 extending the whole effective length of the belt and forming therewith a trough. The side walls 10 approach at their lower edge very close to the surface of the belt to restrict leakage of material past them and the flanges 5 at each side of the belt retain on the belt the small amount of material which may leak past.

These side walls may be in whole or in part of flexible material such as rubber belt which allows of a certain amount of give or resilience in case of obstruction. In some cases, the side walls may comprise endless bands movable either with the belt forming the bottom of the trough or in the opposite direction. In the latter case the side walls cause a mixing movement of the materials charged into the trough.

The side plates 10 may be made removable or slidable to allow of access to the belt for cleaning purposes.

The dry materials to be mixed (that is the aggregate, cement and sand) are loaded on to the top run of the conveyor at the end nearer to the return pulley 4. At this end hoppers 11, 12 and 13 are provided for each of the materials.

In the form shown, the hoppers for the sand (11) and for the aggregate (12) are arranged side by side being separated by a central division plate 14 and each deposits a layer extending over one half the width of the belt.

The cement hopper 13 is situated in front of the sand hopper and deposits a layer of cement, of width equal to one half the width of the belt, on top of the layer of sand.

Where, as in this case, layers of two materials are laid upon one another, provision is made whereby any vertical pressure is unable to exert force on the bed of material coming from the back hopper to such an extent as to prevent or delay the forward motion of the material from the back hopper. For this purpose the hopper 12 is spaced forwardly from the hopper 11 so that between the outlets of the hoppers there is a space 65 within which no cement is deposited on the sand. The downward pressure of the cement in the forward hopper 12 is thus prevented from affecting the feeding of sand from the back hopper 12.

Figure 4:
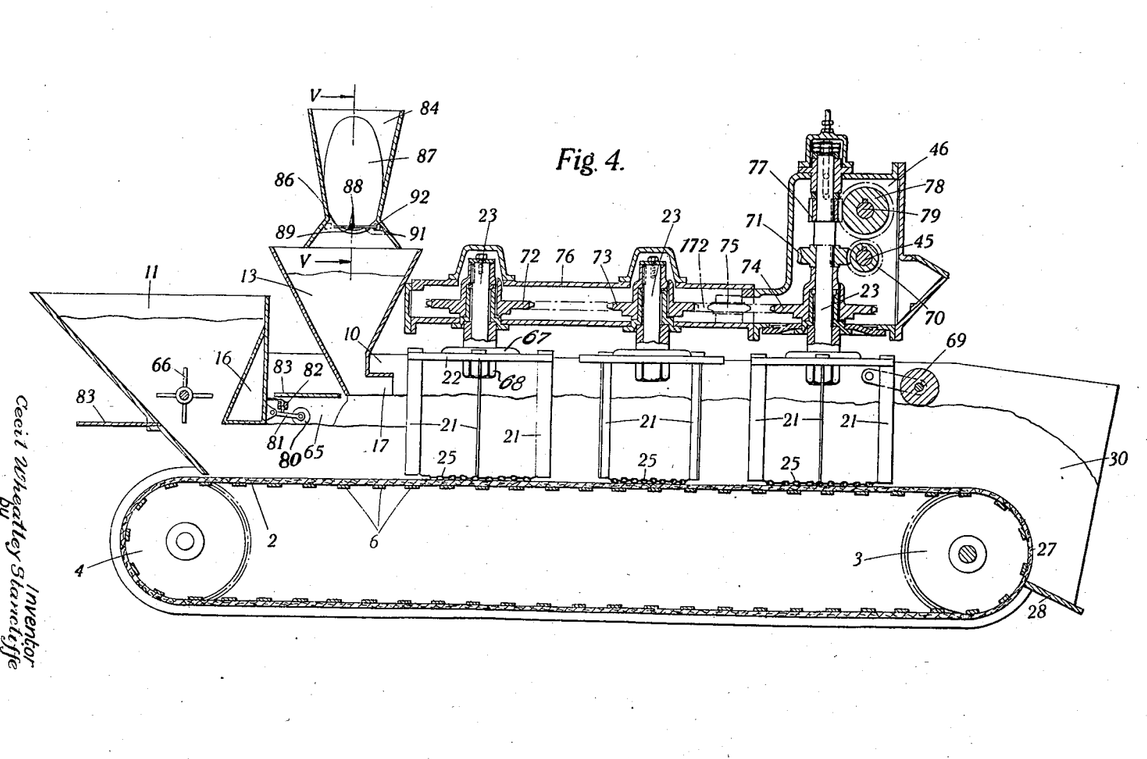
Fig. 4 is a section on the line IV—IV of Fig. 2 of a machine similar to that shown in Figs. 1 to 3 but slightly modified in detail.

In each hopper, agitators or vibrators 66 such as that indicated in hopper 11 in Fig. 4 may be provided to prevent bridging of the materials and to ensure an even flow to the screeds.

The depth of the layers of aggregate, sand and cement is regulated by screeds 15, 16 and 17 respectively. These screeds are made substantially triangular at their bottom ends to provide a more even flow as the material is drawn under the screed. They are also inclined backwardly at the bottom so as to provide a trailing edge which tends to give an even and smooth surface to the material.

The screeds 15, 16 and 17 are each adjustable vertically so that the depths of the layers of aggregate, sand and cement deposited on the belt may be varied to vary the proportions of these materials in the finished concrete.

Between the hoppers and the discharge end of the belt are arranged a series of agitating devices which mix the ingredients together in the trough formed by the side plates 10 and the belt 2. These agitating devices may be rotatable about horizontal or vertical axes as desired and may be paddle rotors, fork mixers or any other suitable type of mixing device.

As shown, three agitators of the fork type, 18, 19, 20 are provided, each with its axis vertical.

Each agitator comprises a number of vertical blades 21 depending from a spider 22 fast to a vertical shaft 23 on which is a driving gear wheel intermeshing with the similar gear wheel of the adjacent agitator or as shown in Fig. 4 with a horizontal chain drive so arranged that adjacent agitators are rotated in opposite directions.

The blades 21 approach quite close to the side walls 10 and two diagonally opposed blades are connected at their bottom by a chain 25 or similar flexible scraping means. This chain rests on the belt thereby wiping it and ensuring mixing right to the bottom of the trough.

The agitators 18, 19, 20 are arranged so as to give to any undue pressure such as that caused by an obstruction. The blades 21 may for example be of a resilient material such as spring steel. In addition, or alternatively, the spider 22 may be free on the shaft 23 and be driven by the friction between it and a collar 67 fast on the shaft 23. A securing nut 68 may be adjusted to increase the pressure between spider 22 and collar 67. When the blades meet with an obstruction, the collar 67 can move relatively to spider 22 and the resultant pressure is not transmitted to the driving means.

The necessary quantity of water is added to the dried materials, already partly mixed by the first agitator at a point near to the second agitator. The water is contained in a tank 26 which is arranged to provide a constant head of water. The tank may be supplied with water by a pump (which may be mounted on the machine) which delivers water for the mix and also for washing down the belt after use. Means which will be described hereinafter are provided for controlling the quantity of water added to the mix and for cutting off the water at appropriate times such as when the belt is stationary.

At various points along the belt, rollers 69 or approximately vertical agitators may be provided for rolling or rodding the concrete.

The agitators 19, 20 mix the water with the dry materials and the mixed concrete passes to the discharge end of the conveyor, where a discharge hopper 30 is arranged of sufficient capacity to store the desired quantity of concrete so that intermittent discharge into barrows is possible. Alternatively, the discharge may be continuous. In some cases the discharge may be to a bucket or like elevator which raises the discharged concrete to the height required and deposits it in trucks or the like.

The discharge hopper 30 is formed between the side plates 10 which extend beyond the driving pulley 3 of the belt and which at their ends 27 are shaped to embrace partially the circumference of this pulley. A bottom plate 28 below the top of the pulley 3 extends transversely between the side plates and a discharge gate 29 closes the rear end of the hopper 30. This gate is pivoted at its upper edge and is opened and closed manually by means of a lever 31. The bottom plate 28 of the discharge hopper slopes downwardly away from the pulley 3 to facilitate discharge of the concrete from the hopper.

The machine is transportable on a pair of wheels 32 mounted on an axle 33 supported by brackets 34 from the chassis 1 at the driving drum end thereof. A smaller caster wheel 35 supports the other end of the chassis and this wheel is vertically adjustable so that the chassis 1 may be raised or lowered to incline the belt 2. By so inclining the belt the material can be caused to fall back to the low point until discharge is required when the belt can be returned to the angle suitable for discharging, for example to the horizontal position.

As shown, the caster wheel 35 is connected to the chassis by a link 36 pivotable at the end connected to the chassis and by a link 37 which is pivotably connected to the caster wheel and is slidable through a guide in a bracket 38 fixed to the chassis. The link 37 is held in position in the bracket 38 when the belt is horizontal by a cotter pin 39. When this pin is released, the link 37 slides in the bracket 38 and allows the chassis 1 to fall relatively to the caster wheel so that the belt is inclined at an angle (for example about 9°) with the charging end lower than the discharging end.

Mounted on the chassis 1 of the machine illustrated is an engine 40 from which drives may be taken for the conveyor belt, and the rotary agitators and for moving the whole machine in either direction. The machine is normally moved from place to place by trailing it behind a tractor but the engine 40 may be used when it is required to move it relatively short distances.

The engine 40 drives through a clutch 41, a sprocket 42 which drives through a chain 43 a sprocket 44 on a shaft 45 of a gear box 46.

A worm 70 on the shaft 45 engages a worm wheel 71 on the vertical shaft 23 of the agitator 20 which is thus driven at a reduced speed. The other agitators are driven by a chain 172 passing around sprockets 72, 73, 74 on the shafts 23 of agitators 18, 19 and 20 respectively. The chain passes from the front of sprocket 74 over an idler 75 to the back of sprocket 73 (on the shaft of the central agitator 19) and thence to the front of sprocket 72 around which it passes to the back of sprocket 74 as shown in dotted lines in Fig. 2. In this way the central agitator 19 is rotated in the reverse direction to agitators 18 and 20.

The gearing is enclosed in a casing 76 in which bearings for the agitator shafts 23 are provided and sealing means are provided where the shafts project from the casing so that the casing 76 may be filled with oil to the desired level whilst the oil is prevented by the sealing means from getting through from the bearings to the concrete.

A worm 77 on the shaft 23 of the agitator 20 engages with a worm wheel 78 on a shaft 79 in the gear box 46. The shaft 79 extends to the outside of the gear box 46 and on it is mounted a sprocket wheel 47. This sprocket wheel drives through a chain 48 a sprocket wheel 49 mounted on the shaft 50 on the driving pulley 3 of the belt. A clutch 51 may be operated by a lever 52 to connect the sprocket 49 to the shaft 50 when the belt is to be driven.

The drive to the wheels is taken from a sprocket wheel 53 coaxially mounted on the shaft 50 and fast with the sprocket wheel 49. A chain 54 passes round this sprocket and also around sprocket wheels 55, 56 which are mounted on stub-shafts 57 and 58 carried by a plate 59. A gear ring 60 is fixed coaxially with the wheel 32 and has both external and internal teeth. Pinions 61 and 62 fast with the sprocket wheels 55 and 56 respectively can be caused to engage with the external or internal teeth of the ring 60 by movement of the plate 59. This plate is mounted on the end of a bent lever 63 pivoted to the chassis and extended beyond its pivot point to provide a handle 64.

Figure 1:
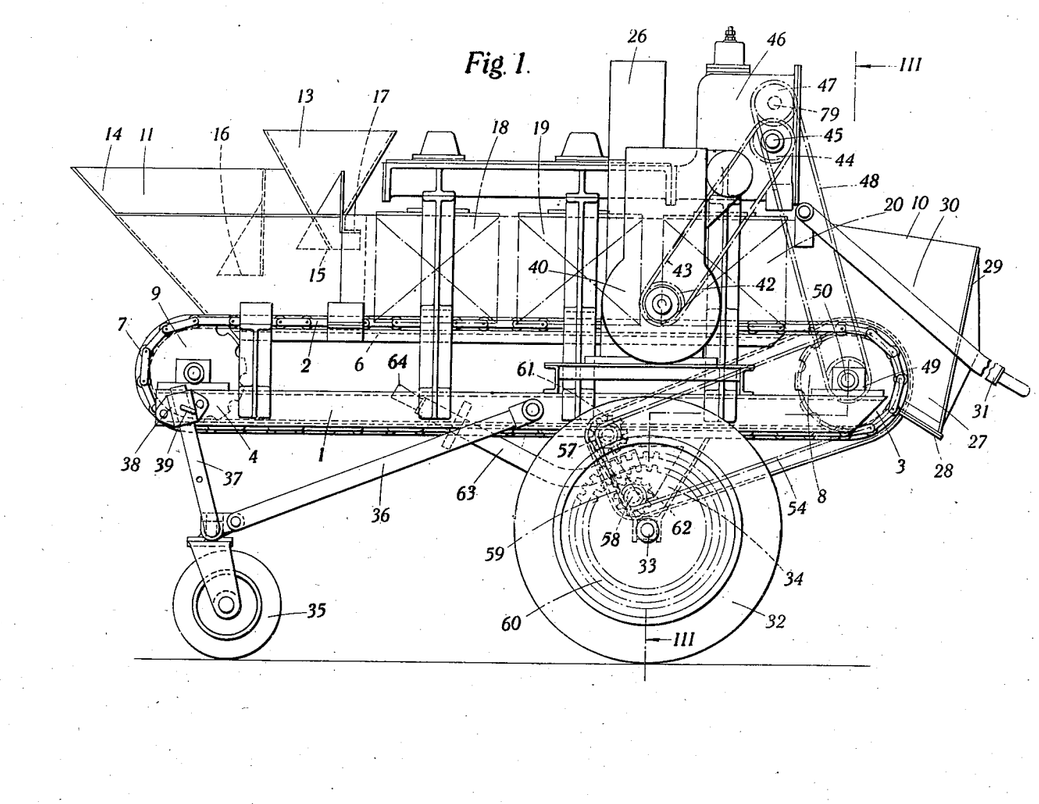
Fig. 1 is a side view of an improved mixing machine.
Figure 2:
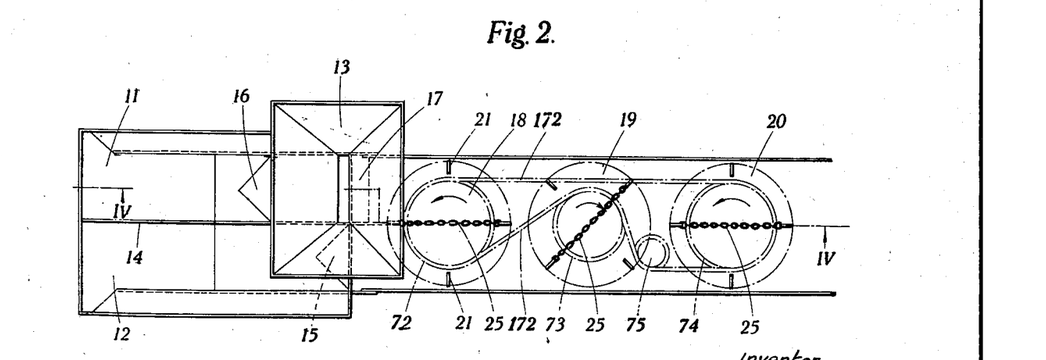
Fig. 2 is a plan view.
Figure 3:
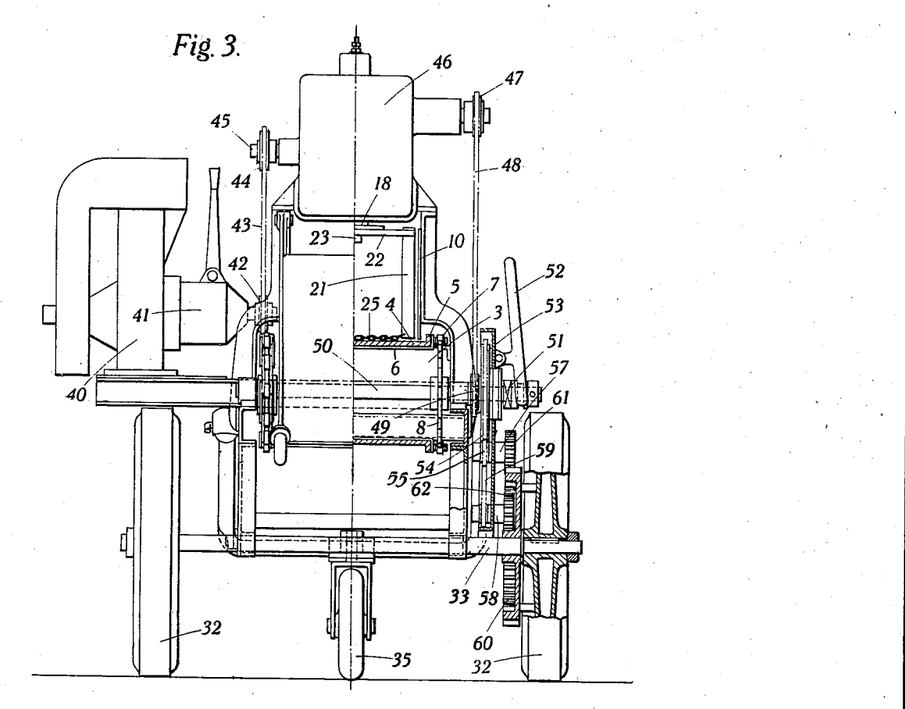
Fig. 3 is partly an end view and partly a cross-section on the line III—III of Fig. 1.

In the position shown in Fig. 1 the lever 63 is in its mid-position and neither the pinions 61 and 62 is in mesh with the gear 60. Movement of the lever 63 upwardly causes the pinion 62 to engage the internal ring of teeth and the machine is moved in one direction. Movement of the lever 63 downwardly causes the pinion 61 to engage the external ring of teeth and the machine is moved in the opposite direction.

It will be seen that, by suitable manipulation of the clutches 41, 51 and the lever 63, the machine can be arranged so that the agitators may be rotated, the belt may be moved and the machine may be translated independently of one another or together as may be desired.

In order that the concrete delivered from a mixer (whether of the belt type described or of any other type) shall be of uniform, pre-determined proportions, it is necessary to proportion correctly the materials charged to the mixer, and it is very desirable that these proportions may be readily adjusted to give different mixes or to compensate for variations in the materials supplied.

Figure 9:
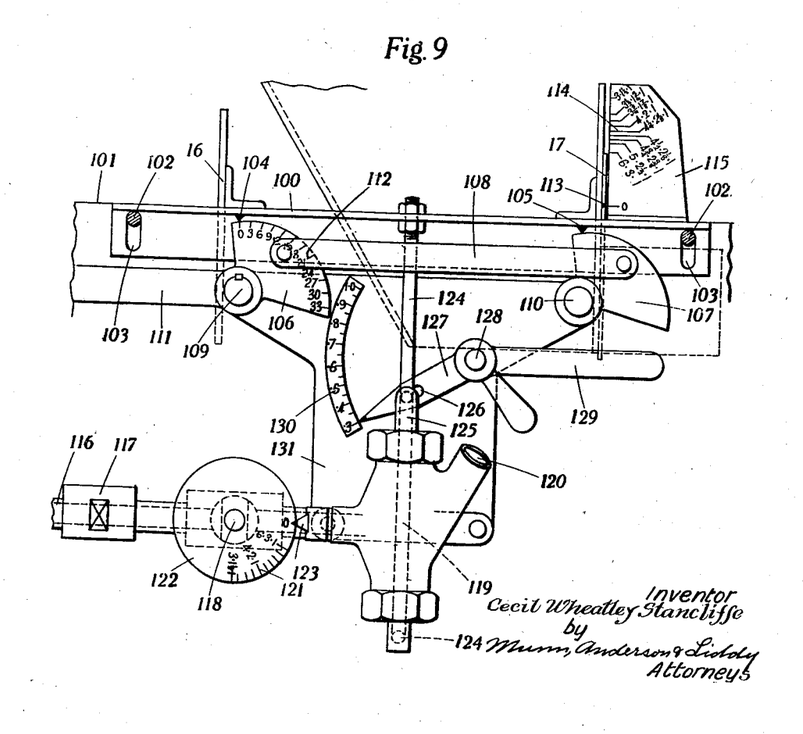
Fig. 9 is a diagrammatic view of one means for adjusting the proportions of materials fed to the machine.

In the specific form described, the proportions of the materials are determined by the heights of the different screeds above the belt which determine the depth of the layer of each material. A preferred method of adjusting these screeds to compensate for the moisture content of the sand used and to allow of easy adjustment of the mix produced is shown in Fig. 9.

A frame 100 carries both the sand screed 16 and the cement screed 17 and is vertically adjustable relatively to the main frame 101. The sub-frame 100 carries projecting bolts 102 which pass through vertical slots 103 in the main frame and the sub-frame may be held in adjusted position by tightening the bolts or by nuts or the equivalent on these bolts.

The sub-frame 101 bears through knife-edges 104, 105 on a pair of similarly shaped cams 106, 107 which are linked together by a bar 108. The cams are mounted on rotatable spindles 109, 110 and an operating lever 111 fast on the spindle 109 is provided to rotate both cams together.

These cams 106, 107 may be rotated to adjust the level of the sand screed and the cement screed to compensate for the bulking of the sand due to the moisture therein and the cam 106 is marked with a scale 112 to facilitate this adjustment. When the cams are in such a position that the zero mark of the scale 112 is aligned with a datum mark (as shown, the knife-edge 104) the sub-frame 101 is in its lowest position with the sand and cement screeds 16, 17 at a predetermined distance above the belt. If the sand is found to contain moisture, the lever 111 is moved to rotate the cams until the datum mark is aligned with the mark on the scale 112 indicating this percentage bulking of the sand. The sub-frame is thus lifted to raise the sand and cement screeds to such a height that the quantity of dry sand delivered remains the same, the cams being shaped so that this adjustment is the result of so moving them. It is of course necessary to raise the cement screed as well as the sand screed because the cement is, in the form described, deposited on top of the sand.

The cement screed 17 is vertically adjustable relatively to the sub-frame 100 to vary the proportion of sand to cement. The screed is slidable in guides carried by the sub-frame and carries a datum mark 113 which moves with the screed relatively to a scale 114 marked on a plate 115. The divisions on this scale indicate the height at which the cement screed must be set for the sand/cement ratio to be as indicated. When the datum is at the zero of this scale, the cement screed is at the same height as the sand screed.

In the form described, the aggregate screed 15 is maintained at a constant height above the belt so that the aggregate to sand ratio is constant and the quality of concrete produced is varied by altering the sand to cement ratio and the scale 114 is marked accordingly. However the aggregate screed might be vertically adjustable to alter the aggregate/sand ratio and a scale provided to indicate the proportions at various heights of the aggregate screed. In this case, the scale 114 indicating the height of the cement screed would preferably be marked in divisions showing the sand/cement ratio only instead of in divisions showing the aggregate/sand/cement ratio as in Fig. 4.

The amount of water to be added to the mix depends both on the amount of water in the sand and on the quality of mix required. The water from the tank 26 is led through a pipe 116 controlled by a stop cock 117 which is linked with the clutch 51 connecting the belt 2 to the driving mechanism so that the water supply is cut off when the belt is stationary. From the cock 117, the water passes through a valve 118 and a valve 119 in series to a pipe 120 leading to the wet mixing zone of the machine.

The valve 118 can be adjusted so that the amount of water passing it is in one-to-one ratio with the amount of cement required for the aggregate/sand/cement ratio of the mix being made. A scale 121 is marked appropriately to correspond with different aggregate/sand/cement ratios on a disc 122 on the spindle of this valve and the appropriate division on this scale is aligned with a fixed pointer 123. This scale 121 is marked so that the valve delivers water in one-to-one water/cement ratio for the amount of cement in the mixture corresponding to the division with which the pointer is aligned.

The valve 119 reduces this one-to-one ratio to the water/cement ratio actually required in the mix and also compensates for the moisture in the sand. The valve 119 is mounted below the delivery level of the water to the mix so that it is continuously flooded. It has a water passage controlled independently by two plungers 124, 125. The plunger 124 is fixed at its end to the sub-frame 101 and as this is moved to compensate for the moisture in the sand, the plunger 124 is moved to shut off the water supply to an extent compensating for this amount of moisture. The other plunger 125 is connected by a pin and slot connection 126 to a lever 127 movable about a pivot 128 by a handle 129 so that its end moves over a scale 130 indicating the water/cement ratio. When the lever 127 is at a division of the scale 130, the plunger 125 is adjusted to let pass the quantity of water apropriate to the water/cement ratio marked at that division.

The cam spindles 109, 110, the scale 130, the valve 119 and the pivot 128 are all supported on a member 131 fixed to the frame of the machine.

The operation of the machine will now be clear. When it is desired to produce a mix of predetermined proportions, the sand screed 16 is adjusted with reference to the scale 112 to compensate for the moisture in the sand. The cement screed 17 is then adjusted so that the datum mark 113 is aligned with the appropriate division on the scale 114. The supply of water is adjusted by adjustment of the scale 121 to the appropriate mix and by adjustment of the lever 127 to indicate the desired water/cement ratio on the scale 130.

With the hoppers 11, 12 and 13 containing aggregate, sand and cement respectively, the belt is driven causing the aggregate and sand to be deposited in side-by-side layers of the correct depths on the belt and the cement to be deposited in a layer of correct depth on the top of the sand layer.

As these layers pass the rotary agitator 18, they are mixed in a dry condition. Water in correctly controlled amounts is added to the materials and the agitators 19, 20 mix this water with the materials. At the discharge end the mixed concrete is discharged through the gate 29 or, if desired, piles up in the hopper 30 until discharge is required.

Provision is made for stopping the machine should the level of one of the strata fall below the desired level. Such means may comprise light rollers 80 resting on the top of the strata and supported by pivoted arms 81 to which are attached contact switches 82 operating on fall of the rollers to cut out the engine spark or to operate declutching mechanism through relays.

Means may also be provided for cutting off the supply from the hoppers, either whilst the belt is stationary or while it is in motion, for the purpose of finishing mixing. Such means may comprise gates which may be operated to prevent the belt drawing further quantities of material from the hoppers. In one form, illustrated in Fig. 4, a horizontal plate 83 can be inserted over the belt and drawn or pushed under the material to be fed so preventing the carrying forward of the materials.

The materials may be fed to the hoppers by elevating conveyors, such for example as bucket elevators.

It is convenient to feed the cement into its hopper in such a way as to avoid the necessity of opening the bag. The cement bag may be placed in correct delivering position over the hopper and a hand-operated knife arranged to be moved across the bag so as to slit it and cause the cement to be delivered into the hopper.

Such an arrangement is illustrated in Figs. 4 and 5. A trough 84 is arranged above the cement hopper 13 and is pivoted at one side thereto at 85 so that it can be turned through 90° from a position across the hopper to the position shown in dotted lines in Fig. 5. The trough 84 is open at the bottom and at each end are supporting plates 86 on which a bag of cement 87 can rest.

Beneath the trough is arranged an upright knife 88 projecting from a rod 89 which can be pulled across the width of the trough by a handle 90. This rod is guided by transverse projections 91 sliding in guides 92.

With the trough 84 in the position shown in dotted lines, a bag of cement can readily be hoisted into the trough resting on the end plate 93 of the trough. The trough is then turned to the position shown in full lines and the bag rests on the supports 86 its weight causing the knife 88 to penetrate into the bag. The knife is then pulled along the bag slitting it and allowing its contents to fall into the hopper 13.

Figures 10, 11:
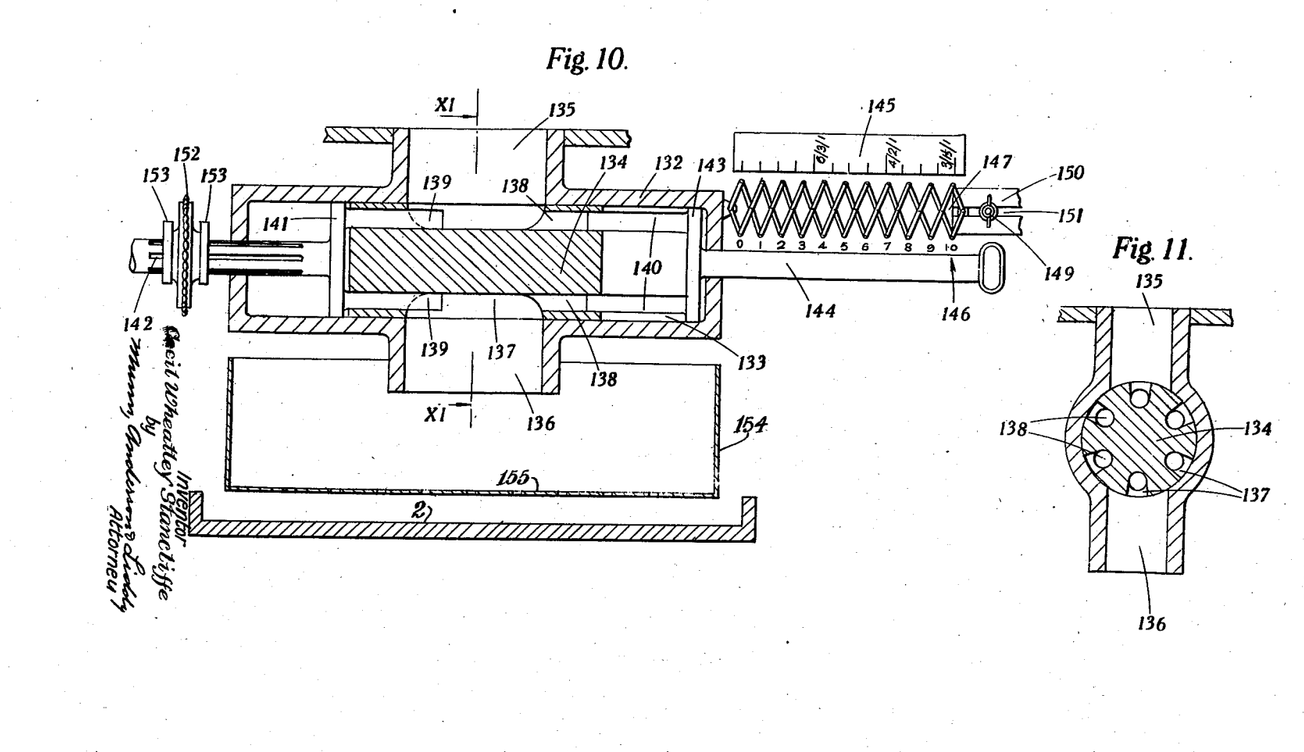
Fig. 10 is a view partly in section of means for controlling the supply of liquid to a mixing machine.
Fig. 11 is a transverse section on the line XI—XI of Fig. 10.

Since the quantities of dry ingredients mixed on the belt is a function of the belt speed, it is desirable that the water supplied shall be varied in accordance with the belt speed in order to preserve correct water/cement ratio despite variations in speed. Figs. 10 and 11 illustrate means for effecting automatically such variation which as shown are combined with means for adjusting the water supply in accordance with the desired water/cement ratio for a predetermined aggregate/sand/cement mix and in accordance with the moisture content of the sand, such means being used instead of those shown in Fig. 9 or, if desired, in addition to those of Fig. 9.

A casing 132 is formed with a cylindrical chamber 133, closed at both ends, within which is mounted a rotary plug 134. Direct communication between an inlet 135 and outlet 136 from the chamber 133 is prevented by this plug.

The plug is formed with a series of pockets 137 parallel to its axis, each pocket being filled with water from the inlet 135 as the plug 134 is rotated and depositing this water into the outlet 136. It will be seen that if the plug 134 is rotated in synchronism with the belt, the amount of water supplied from the outlet 136 is proportional to the belt speed. The inlet 135 is sufficiently large in relation to the water supplied to permit air bubbles to escape. The outlet 137 preferably delivers as shown into a tank 154 having a perforated bottom 155 so that the water is distributed evenly over the belt.

To allow of adjustment of the water supply in accordance with the water/cement ratio required and in accordance with the moisture content of the sand, the capacity of each of the pockets 137 is adjustable. Holes 138, formed in the plug 134 parallel to its axis, enter from opposite ends into the pockets 137 and these holes are closed by rods 139, 140.

The rods 139 closing the holes 138 at one end of the plug are carried by a disc 141 which is movable axially of the plug member 134 by means of a rod 142 so that all the rods 139 are movable together to vary the capacity of each of the pockets 137 by the same amount. Similarly, the rods 140, closing the holes 138 at the other end of the plug are carried by a disc 143 which is movable axially of the plug member 134 by a rod 144 so that all these rods 140 are movable together to vary equally the capacity of each of the pockets 137.

The rod 142 is linked by lever mechanism (not shown) to the lever 111 (or the equivalent) which operates the cam 106 to adjust the sand screed 16 in accordance with the moisture content of the sand. The arrangement is such that the movement of the rod 142 consequential to the movement of the lever 111 moves the rods 139 so as to block partially the pockets 137 and adjust their capacity to that appropriate to the quantity of water required when sand of this moisture content is being used. The rod 142 might alternatively be moved by hand (for example in relation to a scale suitably divided) to adjust the capacity of the pockets for this purpose.

The rod 144 is moved to adjust the capacity of the pockets 137 (by movement of the rods 140) to that appropriate to the required water/cement ratio. A scale 145 marked with divisions indicating different aggregate/sand/cement ratios of mix is fixed adjacent the rod 144 and the rod 144 is marked with a datum mark 146 so arranged that when the mark 146 is adjacent a division on the scale 145, the capacity of the pockets 137 is such that water is supplied in one-to-one ratio with the cement in the mixture indicated by that division.

To allow of adjustment to other water/cement ratios, a scale divider comprising a lazy tongs 147 is provided. This lazy tongs is fixed at one end and can be adjusted so that its other end is adjacent any selected division on the scale 145. The lazy-tongs 147 is conveniently arranged with ten central joints so that the space between successive side pivots is one-tenth of the space between the first and last side pivot and these side pivots may conveniently be marked 0, .1, .2 . . . 1.0, each marking representing a desired water/cement ratio.

In use, the lazy-tongs 147 is adjusted until its end side pivot (that marked 1.0) is adjacent the desired division on the scale 145. The rod 144 is then moved until its datum mark 146 is opposite the side pivot of the lazy-tongs which is marked with the required water/cement ratio. The effect then is that the capacity of the pockets 137 is adjusted to supply water in such quantity as to give the desired water/cement ratio for the desired aggregate/sand/cement ratio of mix.

The lazy-tongs 147 is locked in adjusted position by a nut 149 which is tightened on to a member 150 fixed to the lazy-tongs and having a guide slot 157.

The rotary plug 134 is, as shown, driven by the rods 139. Splined to the rod 142 is a gear wheel 152 which is driven from a shaft of the mixer so as to rotate synchronously with the driving pulley of the belt. The rod 142 is thus rotated and drives the plug 134 through the rods 139. Longitudinal movement of the gear wheel 152 with the rod 142 is prevented by mounting the wheel 152 between fixed brackets 153.

In the mixer shown in Figs. 1 to 4, the cement is deposited directly on to the sand and some slight inaccuracy in the proportions may result by reason of the uneven surface of the sand which in effect forms the bottom of the cement hopper. In Fig. 7 an arrangement is illustrated in which the cement rests in the hopper on the surface of a belt or the equivalent. Aggregate and send are deposited from hoppers 200, 201 on to the surface of a main belt 202 driven by a pulley 203 and passing round a return drum 204. The quantity of sand and aggregate deposited is determined by screeds 205, 206.

The cement is stored in a hopper 207 the bottom of which is formed by the surface of a belt conveyor 208. This conveyor is driven by a chain drive 209 from the pulley 204 of the main belt to the driving pulley 210 of the belt 208. A screed 211 which is adjustable in height determines the thickness of the layer of cement fed from the hopper by the belt 208.

The belt 208 feeds the cement on to the main belt 202, the quantity of cement thus fed being unaffected by inequalities in the surface of the sand on which it is deposited. Since the belts 202 and 208 are driven together, the proportions of cement to sand or aggregate is unaffected by belt speed.

The main belt 202 may be the belt on which the materials are to be mixed by agitators or may deliver the materials, correctly proportioned by the screeds, to a mixing machine of any suitable type.

Figure 8:
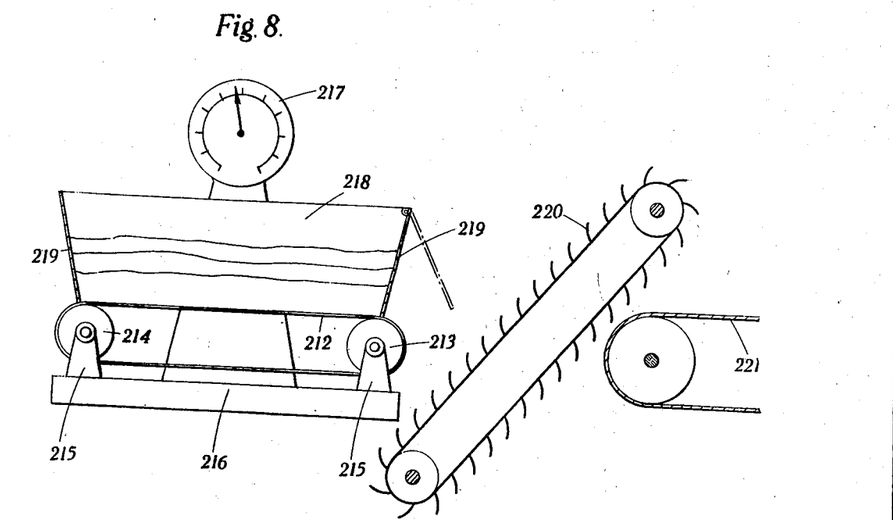
Fig. 8 is a diagrammatic sketch of an alternative form of proportioner in combination with a mixing machine.

In Fig. 8, there is illustrated an arrangement by which the materials to be mixed may be proportioned by weight. An endless belt 212 passes around rollers 213, 214 which are mounted in bearings in pedestals 215 on the platform 216 of a weighing machine. The materials are deposited in layers on the belt 212, the weight of each layer being indicated for example on a dial scale 217 of the weighing machine. Side plates 218 and end plates 219 confine the material to the belt.

One end plate 219 is formed as a gate or door through which the materials after weighing are delivered by driving the belt 212. As shown in Fig. 8, the belt 212 delivers the material into a bucket elevator 220 which in turn delivers them to a mixing machine indicated by the belt 221.

It will be understood that the invention is not restricted to the details of the specific form described. In particular, it is to be understood that other methods of proportioned material mixed on a belt may be used instead of the specific arrangement described. Further the method of proportioning materials on a belt and the arrangements whereby such proportioning can be adjusted to produce a predetermined mix can be used in cases where the actual mixing is not done on a belt but in some other manner, as for instance in a rotary drum.

Furthermore, the term "belt" in this specification and in the claims is intended to include endless conveyors of any type of which the conveying surface is capable of supporting the materials to be mixed.

I claim:

1. Apparatus for proportioning materials comprising an endless belt, means for depositing the materials on the surface of the belt in layers of which some at least are superposed, a plurality of screeds beneath which the materials are drawn by the belt to limit the depth of each layer, means for adjusting the screeds to vary the depth of each layer, and means interconnecting the screeds determining the depths of a lower and an upper layer whereby adjustment of the screed determining the depth of the lower layer is effective to adjust the screed of the upper layer to maintain the thickness of the upper layer constant.

2. Apparatus for proportioning materials comprising an endless belt, means for depositing the materials in layers on the surface of the belt, a plurality of screeds beneath which the materials are drawn by the belt to limit the depth of each layer, means for adjusting the screeds to vary the depth of each layer, and means for determining the adjustment of at least one screed in accordance with the moisture content of the material.

3. Apparatus for proportioning materials comprising an endless belt, means for depositing substantially solid materials in layers on the surface of the belt, a plurality of screeds beneath which the materials are drawn by the belt to define the depth of each layer, means for supplying liquid to the materials on the belt, means for adjusting at least one screed in accordance with the moisture content of the material of which it determines the depth, and means controlling the supply of liquid and interconnected with these screed adjusting means to adjust the water supply in accordance with the moisture content of the material.

4. A mixing machine comprising an endless belt, means for depositing substantially solid materials on the belt, means controlling the mutual proportions of these materials, means for supplying liquid to the materials on the belt, and means for adjusting the supply of liquid so interconnected with the means controlling the mutual proportions of the other materials that liquid is supplied in predetermined proportions to the other materials.

5. In a mixing machine comprising an endless belt on which solid materials are deposited in predetermined proportions, and mixed by agitating devices, a device for controlling the supply of liquid to the belt comprising a member having a supply passage therethrough, a rotatable member in the supply passage, said rotatable member being formed with a plurality of compartments open to the supply passage, means for rotating the rotatable member in synchronism with the belt speed, means for adjusting the capacity of the compartments of the rotary member, and means for determining the adjusted capacity of these compartments so as to deliver liquid in accordance with the moisture content of one of the solid materials.

6. In a mixing machine comprising an endless belt on which solid materials are deposited in predetermined proportions and mixed by agitating devices, a device for controlling the supply of liquid to the belt comprising a member having a supply passage therethrough, a rotatable member in the supply passage, said rotatable member being formed with a plurality of compartments open to the supply passage, means for rotating the rotatable member in synchronism with the belt speed, means for adjusting the capacity of the compartments of the rotary member, and means for determining the adjusted capacity of these compartments so as to deliver liquid in accordance with the ratio of liquid desired to one of the ingredients of a predetermined mixture.

7. In a concrete mixing machine in which aggregate, sand and cement are deposited in layers on an endless belt movable past agitating devices, the combination of screeds determining the thickness of the layers, means for adjusting these screeds in relation to scale divisions to proportion the materials in the predetermined ratios indicated by the scale divisions, means for adjusting one or more screeds in relation to scale divisions representing moisture content of the material, to adjust the thickness of a layer of wet material so that a predetermined quantity of dry material is deposited on the belt, means for supplying liquid to the materials on the belt, means for adjusting the supply of liquid in relation to the proportions of aggregate, sand and cement in the finished mix, means for further adjusting the supply of liquid in accordance with the required water/cement ratio and means for adjusting the supply of liquid interconnected with the second mentioned screed-adjusting means to reduce the amount of liquid supplied in accordance with the moisture content of the wet material.

8. The combination defined in claim 7 in which the liquid supply means comprises a valve having a through passage for the liquid, a rod projecting into this passage to an extent determined by the position of the rod in relation to a scale divided in accordance with predetermined water/cement ratios and a second rod projecting into this passage and connected to the screed-adjusting means so that its position in the passage is determined by the adjustment of the screed to compensate for moisture content of the material.

9. The combination defined in claim 7 in which the liquid supply means comprises a member having a supply passage therethrough, a rotatable member in the supply passage formed with a plurality of compartments open to the supply passage, means for rotating the rotatable member in synchronism with the belt, closure members each end of the compartments of the rotatable member movable therein in the longitudinal direction to adjust the capacity thereof, said closure members at one end being interconnected to the screed adjusting means and said closure members at the other end being connected to move together, a scale indicating desired mixes in various proportions of dry materials, a lazy-tongs scale divider adjacent this scale and adjustable to any division thereof and a member connected to the second set of closure members adjustable to any section of this scale divider to adjust the capacity of the chambers in accordance with the desired proportion of liquid to solid material for the selected mix.

10. Apparatus for proportioning materials to be mixed comprising hoppers for the materials, said hoppers having open ends, an endless belt beneath the open ends of said hoppers, means for moving the endless belt to withdraw the material in layers on the belt, screeds situated transversely of the belt limiting the upward extent of each layer, means operating when the depth of a layer is less than a predetermined amount to stop the movement of the endless belt, said means comprising a pivoted lever, a roller on the end of the pivoted lever adapted to rest on the top of the layer of material on the belt so that said lever rises and falls as the thickness of the layer varies, and means operated by said movement of the lever to control the means for moving the belt.

CECIL WHEATLEY STANCLIFFE.